Figure 1:
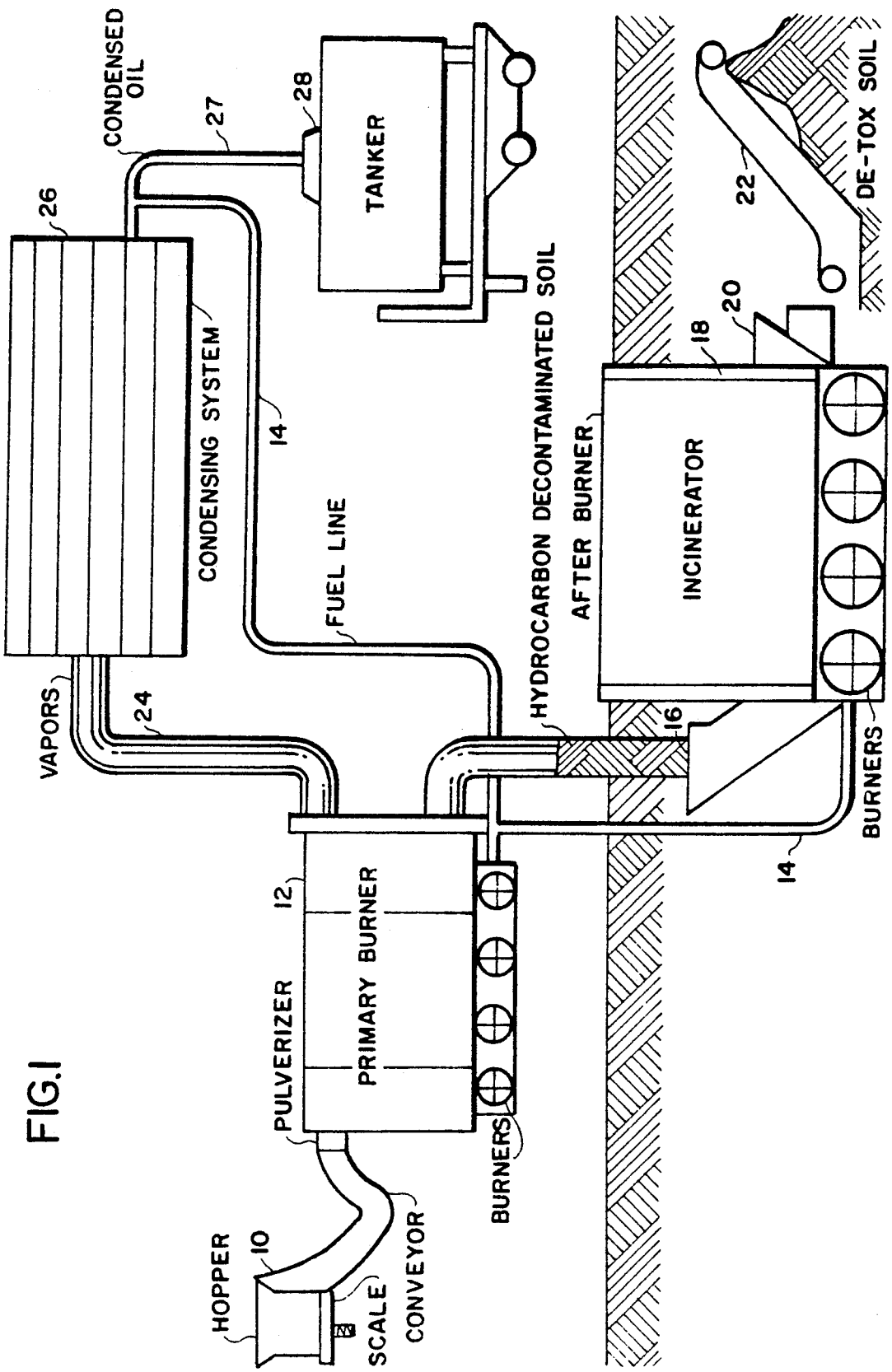

United States Patent [19]

Hutter

[11] Patent Number: 5,275,507
[45] Date of Patent: Jan. 4, 1994

[54] SOIL DECONTAMINATION METHOD

[76] Inventor: Gerhard Hutter, 993 Lake Ave., Greenwich, Conn. 06830

[21] Appl. No.: 806,248

[22] Filed: Dec. 13, 1991

[51] Int. Cl.⁵ .............................................. B09B 5/00
[52] U.S. Cl. ................................... 405/128; 405/131; 405/258; 134/19; 134/30
[58] Field of Search ............. 405/128, 131, 258; 134/10, 19, 25.1, 30; 166/267

[56] References Cited

U.S. PATENT DOCUMENTS

| | | | |
|---|---|---|---|
| 4,139,462 | 2/1979 | Sample | 134/19 X |
| 4,834,194 | 5/1989 | Mandrak | 405/131 X |
| 5,056,541 | 10/1991 | Schade et al. | 134/25.1 |
| 5,088,856 | 2/1992 | Yocum | 405/131 X |
| 5,098,481 | 3/1992 | Monlux | 134/19 |

FOREIGN PATENT DOCUMENTS

| | | | |
|---|---|---|---|
| 253079 | 1/1988 | European Pat. Off. | 134/19 |
| 284156 | 9/1988 | European Pat. Off. | 134/19 |
| 324566 | 7/1989 | European Pat. Off. | 134/19 |

*Primary Examiner*—David H. Corbin
*Assistant Examiner*—Arlen L. Olsen
*Attorney, Agent, or Firm*—Alfred E. Miller

[57] ABSTRACT

A method of processing contaminated soil whereby the soil in the form of feed stock is heated in a combustion chamber of a processor with the hydrocarbons being evacuated to a condensing system resulting in a petroleum product while the soil feed stock is detoxified in an afterburner to form clean soil for general use.

3 Claims, 1 Drawing Sheet

SOIL DECONTAMINATION METHOD

The present invention relates to a method of recovering petroleum from decontaminated soil and additionally detoxifying the soil so that it can be used, for example for general road and excavation use.

BACKGROUND OF THE INVENTION

In the past many systems and processes have been devised in order to remove hydrocarbons due to various oil spills on water and land with various degrees of effectiveness.

For example U.S. Pat. No. 3,520,367 to Needham is directed to a process for recovering oil in an oil bearing subterranean strata using steam at temperatures and pressures which minimize damage to the tubing and casings of the apparatus. U.S. Pat. No. 4,529,496 to Kryer concerns recovery of oil from mined oil sand, such as tar and bituminous sands. U.S. Pat. No. 5,057,227 to Cohen is directed to a process for managing ground water which has been contaminated with hydrocarbons, such as petroleum products, and one of the methods described is the removal of contaminated soil with a subsequent soil treatment, which is not particularly set forth.

The present invention relates to a system using an oil reclamation processor which has an assembly directed toward handling of solid materials such as pit sludge, well cuttings, tar sands and soils contaminated by surface spills.

It is a principal object of the present invention to excavate the contaminated soil and reclaim the hydrocarbons therein while detoxifying the soil so that it may be reused for general fill, for example for road or general excavation use.

It is a further object of the present invention to transport the decontaminated soil from an excavation site into a soil processor whereby the petroleum mixed in with the soil is extracted and delivered to a tanker for reuse, while the soil passes through a further processor wherein the toxic elements remaining in the soil are removed and the decontaminated soil material is transported to an area accessible for removal.

It is a further object of the present invention to provide an arrangement whereby contaminated feed stock can be accelerated or decelerated for the proper distillation of the feed stock, which varies with the petroleum content of the soil.

It is a further object of the present invention to provide an operating fuel with proper emission controls for cleaning exhaust fumes in order to meet EPA requirements of the United States.

Another object of the present invention is to provide a soil decontamination processor which is housed on a trailer bed for quick dispatch to any location wherein a cleanup is desired.

Still another feature of the present invention is to provide means for testing the soil material periodically in order to maintain quality control.

In order that the present invention may be more clearly understood it will now be disclosed in greater detail with reference to the accompanying drawing wherein the sole Figure shows an oil decontamination processor assembly in which contaminated soil is placed into the system and the petroleum therein is recovered while the soil is processed and detoxified, and in which the remaining soil may be disposed of as a general fill for road or excavation use all in accordance with the teachings of my invention.

SUMMARY OF THE PREFERRED EMBODIMENTS OF THE INVENTION

The decontaminated soil material is excavated and deposited into dump trucks or carried by other devices, such as a front end loader or any conventional construction equipment, to a holding feeder hopper 10. At this point in the process it is desirable to have an automatic weigh system which registers the tonnage of the soil passing through for control purposes. Thereafter, the first step in the process is the screening of rocks, sticks and other miscellaneous debris from the soil material being processed. The material then is deposited into a lifting conveyor and preheated by exhaust gases prior to entry into the processor's combustion chamber 12.

While the aforesaid action continues to take place temperature readings are monitored to maintain the output of hydrocarbon products and decontaminated soil quality standards.

Further the processor is provided with a variable speed transmission which is operated in conjunction with the continuously monitored temperature readings in order to either accelerate the soil feed stock, or to increase the resident time of the feed stock in the processor, so that the proper distillation of the soil feed stock is obtained. In this connection it should be apparent that the speed of transmission of the soil feed stock in the processor varies with the petroleum content of the decontaminated soil.

The operating fuel in the fuel line 14 is preferably natural gas or propane, which is the only exhaust being emitted into the atmosphere during operation of the decontamination processor. However, in the event that recovered Number 6 crude oil is reused as fuel for the operation, the processor and assembly further includes emission controls for cleaning exhaust fumes in accordance with U.S. EPA requirements. All other gases in the system are recirculated back into the processor for reburn, which additionally allows the process to meet all EPA requirements.

It should be noted that the processor assembly is self contained on custom trailer beds and has all that is necessary to be quickly dispatched to even the most remote areas for cleaning up contaminated sites.

Upon entry into the combustion chamber of the processor, the soil feed is pulverized into 2 to 3 inch stock. The stock material is transported through the processor and heated to a temperature of 900 to 1500 degrees. This processor evaporates at least 95% of the hydrocarbons which are evacuated through the vapor line 24 to the condensing system 26, that is preferably a tube and shell condenser, which condenses the product into a liquid state whereby the liquid flows through the pipe 27 to a tanker truck 28.

The processed decontaminated soil is deposited into a holding hopper 16 where the material is tested periodically in order to maintain quality control. Upon testing, if there is any remaining contamination, such as PCBs, toxins etc., the soil is passed through an afterburner 18 which heats the feed material to a temperature of 2,200 degrees. This high temperature destroys all toxic elements in the feed stock. The decontaminated soil material is then deposited into a holding hopper 20 where the material is tested every hour to maintain quality control. Thereafter, the detoxified soil material is removed by means of a conveyor 22 or by means of dump trucks or other equipment (not shown) for disposal into a land fill. In the alternative, the detoxificated soil can be moved back to the original area from which it came, or sold for general fill for roads or excavation use.

It should be apparent that the present invention is especially useful for extracting crude oil from contaminated soil due to oil spills, whether created inadvertently or deliberately, so that the soil after cleaning, can be utilized and the oil recovered for reuse.

While the present invention has been disclosed and described with reference to a certain embodiment thereof, it is apparent that other variations and embodiments may be made which fall within the true scope of the invention, as defined in the following claims:

What I claim is:

1. A method of detoxifying soil heavily contaminated with oil spills and recovering petroleum therefrom comprising steps of:
   A) Excavating contaminated soil and transporting the soil to a hopper
   B) Screening the soil of rocks, stones and miscellaneous debris to form feed stock
   C) Preheating the feed stock by passing exhaust gases thereover,
   D) Passing the feed stock through a combustion chamber of a processor,
   E) Evacuating at least 95% of the hydrocarbons in the feed stock through a vapor line to a condensing system whereby the hydrocarbons are condensed to a liquid petroleum product
   F) Passing the feed stock through an afterburner which heats the feed stock to a temperature of approximately 2200 degrees fahrenheit to destroy the remaining toxic elements in the soil feed stock, and
   G) Removing the detoxified soil feed stock from the afterburner for general use.

2. The method as claimed in claim 1 wherein the operating fuel in the combustion chamber of said processor is natural gas.

3. The method as claimed in claim 1 wherein the operating fuel in the combustion chamber of said processor is propane.

* * * * *